(12) United States Patent
Hudson

(10) Patent No.: US 7,215,035 B2
(45) Date of Patent: May 8, 2007

(54) METHOD AND APPARATUS FOR CONVERTING WIND GENERATED ELECTRICITY TO CONSTANT FREQUENCY ELECTRICITY FOR A UTILITY GRID

(75) Inventor: Raymond M. Hudson, Livermore, CA (US)

(73) Assignee: Xantrex Technology, Inc., Arlington, WA (US)

( * ) Notice: Subject to any disclaimer, the term of this patent is extended or adjusted under 35 U.S.C. 154(b) by 34 days.

(21) Appl. No.: 11/063,409

(22) Filed: Feb. 22, 2005

(65) Prior Publication Data

US 2006/0186670 A1    Aug. 24, 2006

(51) Int. Cl.
*H02P 9/00*    (2006.01)
(52) U.S. Cl. ....................................... 290/44
(58) Field of Classification Search .................. None
See application file for complete search history.

(56) References Cited

U.S. PATENT DOCUMENTS

| | | | |
|---|---|---|---|
| 4,695,736 A | | 9/1987 | Doman et al. |
| 4,994,684 A | * | 2/1991 | Lauw et al. .................. 290/52 |
| 5,028,804 A | * | 7/1991 | Lauw ....................... 290/40 C |
| 5,798,631 A | * | 8/1998 | Spee et al. ..................... 322/25 |
| 6,137,187 A | * | 10/2000 | Mikhail et al. ............... 290/44 |
| 6,566,764 B2 | * | 5/2003 | Rebsdorf et al. ............. 290/44 |
| 6,741,059 B2 | * | 5/2004 | Gokhale et al. ............. 318/700 |
| 6,855,028 B2 | * | 2/2005 | Siegel ......................... 446/486 |
| 6,924,565 B2 | * | 8/2005 | Wilkins et al. ............... 290/44 |
| 6,954,004 B2 | * | 10/2005 | Skeist et al. .................. 290/44 |
| 2002/0079706 A1 | * | 6/2002 | Rebsdorf et al. ............. 290/55 |
| 2004/0026929 A1 | * | 2/2004 | Rebsdorf et al. ............. 290/44 |
| 2004/0151584 A1 | * | 8/2004 | Blakemore ..................... 416/9 |
| 2004/0222642 A1 | * | 11/2004 | Siebenthaler et al. ......... 290/44 |
| 2004/0257832 A1 | * | 12/2004 | Skeist et al. .................... 363/1 |
| 2005/0040655 A1 | * | 2/2005 | Wilkins et al. ............... 290/44 |
| 2005/0151377 A1 | * | 7/2005 | Ichinose et al. .............. 290/44 |

(Continued)

FOREIGN PATENT DOCUMENTS

EP    1499009 A1 *   1/2005

(Continued)

OTHER PUBLICATIONS

T.A. Lipo, "Variable Speed Generator Technology Options for Wind Turbine Generators," Department of Electrical and Computer Engineering, University of Wisconsin (1984).

(Continued)

*Primary Examiner*—Joseph Waks
(74) *Attorney, Agent, or Firm*—Bernard L. Kleinke; Duckor Spradling Metzinger & Wynne

(57) ABSTRACT

A method and apparatus for converting wind generated electricity to constant frequency electricity for supplying it to a utility grid. use a wind turbine generator having a doubly fed induction generator. Above the synchronous speed of the generator, the electricity from the rotor is converted to direct current (dc) electricity and the de electricity is converted back to alternating current (ac) electricity at a fixed unity power factor. Below synchronous speed, electricity flows to the rotor from the utility grid also at a fixed unity power factor. The current of the ac electricity is adjusted to be in phase with the utility grid voltage, wherein the ac electricity is maintained substantially at unity power factor.

64 Claims, 1 Drawing Sheet

U.S. PATENT DOCUMENTS

2005/0236838 A1* 10/2005 Rosebrock et al. ........... 290/44
2005/0253396 A1* 11/2005 Mikhail et al. ............... 290/44
2006/0028025 A1*  2/2006 Kikuchi et al. ............... 290/44
2006/0244265 A1* 11/2006 Ichinose et al. .............. 290/44

FOREIGN PATENT DOCUMENTS

| GB | 2411252 A * | 8/2005 |
| GB | 2420456 A * | 5/2006 |
| WO | WO 2004040748 A1 * | 5/2004 |
| WO | WO 2004098261 A2 * | 11/2004 |
| WO | WO 2006030183 A1 * | 3/2006 |

OTHER PUBLICATIONS

T.S. Jayadev, "Novel Electric Generation Schemes for Wind Power Plants," College of Engineering and Applied Science, University of Wisconsin-Milwaukee (1975).

Werner Leonhard, "Control of Electrical Drivers—Third Edition," pp. 303-316, Springer-Verlag Publishing Group (2001).

* cited by examiner

METHOD AND APPARATUS FOR CONVERTING WIND GENERATED ELECTRICITY TO CONSTANT FREQUENCY ELECTRICITY FOR A UTILITY GRID

FIELD OF THE INVENTION

The present invention relates in general to a method and apparatus of converting wind generated electricity, to constant frequency electricity. It more particularly relates to such a method and apparatus useful in providing constant frequency electricity to a utility grid.

BACKGROUND ART

There is no admission that the background art disclosed in this section legally constitutes prior art.

Various different techniques have been employed in connection with the use of wind turbine generators for converting wind generated electricity, to constant frequency electricity for supplying it to a utility grid. Such techniques include the use of rectifier/inverter bridges, with a direct current (dc) link, coupled to the rotor of a doubly fed induction generator. Power factor variable correction or adjustment may be desirable for some applications. For example, reference may be made to an article by T. A. Lipo, entitled, "*Variable Speed Generator Technology Options for Wind Turbine Generators,*" Department of Electrical and Computer Engineering, University of Wisconsin (1984). Furthermore, reference may be made to an article by T. S. Jayadev, entitled, *"Novel Electric Generation Schemes for Wind Power Plants,"* College of Engineering and Applied Science, University of Wisconsin, Milwaukee, presented at the Second Workshop on Wind Energy Conservation Systems, Washington, D.C. (1975); and a book by Werner Leonhard, entitled *"Control of Electrical Drivers,"* Springer-Verlag Publishing Group. Additional reference may be made to U.S. Pat. Nos. 4,695,736 and 6,137,187.

BRIEF DESCRIPTION OF THE DRAWINGS

The features of this invention and the manner of attaining them will become apparent and the invention itself will be best understood by reference to the following description of certain embodiments of the invention taken in conjunction with the accompanying drawings, wherein.

DETAILED DESCRIPTION OF CERTAIN EMBODIMENTS OF THE INVENTION

Figure 1:
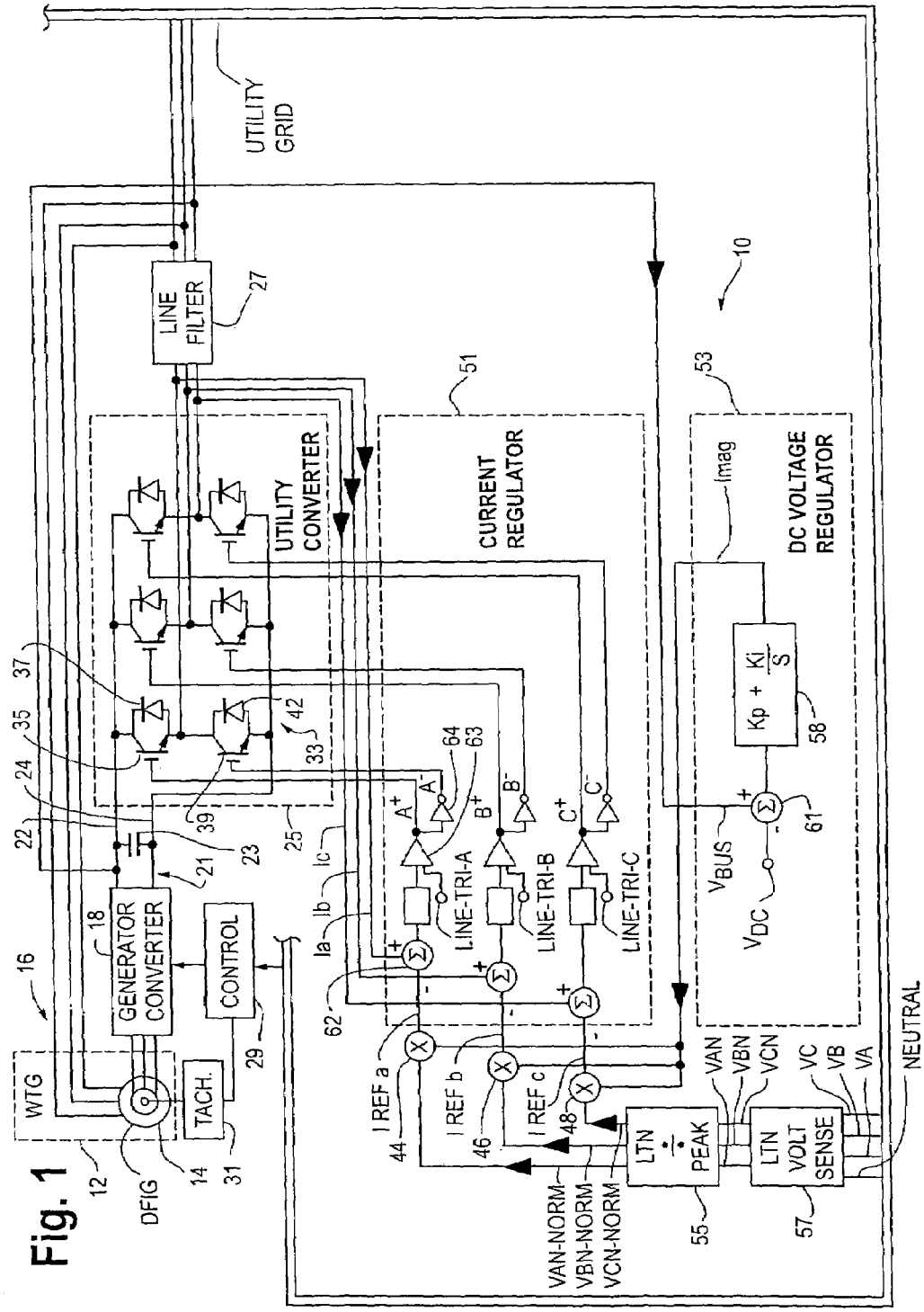
FIG. 1 is a symbolic block diagram of a wind generated electricity converting system, which is constructed in accordance with an embodiment of the present invention.

A method and apparatus are disclosed for converting wind generated electricity to constant frequency electricity for supplying it to a utility grid. The disclosed system and method uses a wind turbine generator having a doubly fed induction generator. Above the synchronous speed of the generator, the electricity from the rotor is converted to direct current (dc) electricity and the dc electricity is converted back to alternating current (ac) electricity at a fixed unity power factor. Below synchronous speed, electricity flows to the rotor from the utility grid also at a fixed unity power factor. The current of the ac electricity is adjusted to be in phase with the utility grid voltage, wherein the ac electricity is maintained substantially at unity power factor. "Unity Power" means a power factor at least Greater than 0.99, leading or lagging, as close as possible to one.

According to the disclosed embodiment of the invention, electricity is also generated from the stator of the doubly fed induction generator.

According to certain embodiments of the invention, the adjusting of the current of the ac electricity to be in phase with the utility grid voltage, includes calculating a desired current magnitude and multiplying it by a normalized sensed voltage value of the utility grid voltage to provide a desired current value for current regulation of the ac electricity in phase with the utility grid voltage without any substantial phase shift. According to an embodiment of the invention, the calculating may include subtracting the value of the dc voltage from a desired value of the dc voltage to provide an error voltage value for dc voltage regulation.

According to an embodiment of the invention, the calculating may also include using a closed loop controller such as a proportional and integral controller for regulating the dc voltage value to produce the desired current magnitude.

In accordance with the disclosed embodiments of the invention, the determining of the normalized voltage value may be achieved by sensing the line to neutral voltage of the utility grid, and dividing the value of the sensed voltage by the peak magnitude of the sensed voltage to provide the normalized voltage value. According to another aspect of an embodiment of the invention, the actual current magnitude is regulated in response to the desired value of the ac current.

Referring now to FIG. 1, there is shown a wind generated electricity converting system 10, which is constructed in accordance with an embodiment of the invention, and which is used to supply constant frequency electricity to a utility grid. The system 10 includes a wind turbine generator 12 having a doubly fed induction generator (DFIG) 14, which supplies ac electricity via its stator at a desired power factor via three-phase power leads or lines 16 to the utility grid. The desired power factor of the ac electricity from the stator is achieved by rotor current control.

A generator converter 18 is connected to the rotor of the generator 14 for controlling currents of the rotor of the DFIG 14 to cause the electricity from the stator to be controlled to a desired power factor, and the generator to provide a desired torque level. The power factor of the stator may be adjusted by the control 29, which may also convert the ac electricity. The rotor electricity is supplied to a dc bus 21 via converter 18 where the dc electricity is stored in a capacitor or bank of capacitors such as a capacitor 23 connected across dc bus leads 22 and 24. Above synchronous speed of the generator, a utility converter 25 converts the dc electricity from the dc bus 21 to constant frequency ac electricity and supplies it to the utility grid via a line filter 27. Below synchronous speed, the utility converter 25 actively rectifies ac electricity from the grid and regulates it for supplying dc electricity to the generator converter 18, which in turn supplies ac current to the rotor of the generator.

In accordance with the disclosed embodiment of the invention, as hereinafter described in greater detail, the current of the ac electricity from the utility converter 25 is adjusted to be in phase with the utility grid voltage. Thus, the ac electricity from the utility converter 25 supplied to the utility grid is maintained substantially at all times at unity power factor. Thus, in accordance with the disclosed embodiments of the present invention, ac electricity is supplied to the utility grid via both the stator and the rotor of the doubly fed induction generator 14 at or above synchronous speeds of the generator. Below synchronous speeds, ac current is supplied to the rotor, and power is generated by the stator and supplied to the grid. The DFIG 14 under the control of the generator converter 18 adjusts the reactive power so that the ac electricity supplied by the stator is supplied at a selectively adjustable power factor. The ac electricity provided by the rotor of the generator 14 has a non-adjustable fixed unity power factor as a result of current regulation via the utility converter 25 in accordance with the disclosed embodiment of the present invention.

According to an embodiment of the invention, such as one having a DFIG with 6 poles and a synchronous speed of 1,200 rpm when the station is connected to a 60 Hz grid, approximately two-thirds of the power may be supplied by the stator of the generator 14 at an adjustable power factor to the utility grid, while approximately one-third of the power supplied by the generator 14 from its rotor is efficiently and economically provided to the utility grid at a constant fixed unity power factor. The ratio of the division of the power between the rotor and the stator may be determined by the winding ratio. Such a technique is reliable and effective, and is a simplified approach as compared to power factor correction such as rotation of the template wave forms and other such techniques employed in the prior art.

Considering now the generator converter 18 in greater detail, the generator converter 18 is a switched inverter and provides current flow to the rotor below synchronous speed until the generator 14 reaches a synchronous speed. Above synchronous speed, the generator 14 generates three-phase ac electricity from its rotor and supplies it through the generator converter 18, which then serves as an active rectifier to supply dc electricity to the dc bus 21. A control circuit 29 is employed to control the electricity through the generator converter 18 to or from the rotor of the DFIG 14 during the operation thereof A tachometer 31 monitors the shaft speed and position of the rotor of the DFIG for the control circuit 29.

A calculation of desired rotor current is then performed by the control circuit 29 utilizing conventional generator calculations and the mechanical angle sensed by the tachometer 31, together with the torque requirement and the flux requirement based upon a desired power factor. The resulting calculation is the desired rotor current supplied to the rotor of the DFIG 14 to cause it to generate the electricity from its stator at the desired power factor. The torque requirement is the amount of torque at a given wind speed (may be peak energy capture). A computer (not shown) may be used to determine the desired torque by retrieving the information from a look up table stored in the computer memory (not shown). The flux requirement may be determined based upon the desired power factor at any given time as required by the utility grid.

Considering now the utility converter 25 in greater detail, the utility converter 25 comprises a switched inverter generally indicated at 33. The switched innverter 33 comprises three pairs of insulated gate bi-polar transistors (IGBTs), such as the A+IGBT 35 having a parallel connected diode 37 both connected to the plus side of the do bus 21, and a A-IGBT 39 and its diode 42 connected to the negative side of the do bus 21 for regulating the A phase of the power. Thus, positive or negative regulation can be provided in each one of the A, B and C phases under the control of a current regulator 51.

A set of three multipliers 44, 46, and 48 together with circuits 55 and 57 help control the respective A, B, and C phases of the utility converter 25 by providing reference currents I REF a, I REF b, and I REF c via the current regulator 51 to the utility converter 25. A dc voltage regulator 53 provides a current magnitude signal Imag to each one of the three multiplier circuits 44, 46, and 48, where the signal Imag is indicative of the desired current magnitude to be processed by the utility converter 25 for the utility grid. The value Imag is multiplied by normalized voltage values VAN-NORM, VBN-NORM and VON-NORM as calculated from the voltage sensed from the utility grid. In this regard, a divider circuit 55 divides the line to neutral voltage VAN, VBN, and VON sensed via a line-to-neutral voltage sense circuit 57, by the peak voltage from the grid. In this regard, the sense circuit 57 senses voltages VA, VB, and VO from the utility grid and supplies the sensed voltages VAN, VBN, and VON to the division circuit 55. The circuit 55 generates the normalized signals VAN-NORM, VBN-NORM and VON-NORM which are, in turn, each multiplied by the desired current signal Imag to produce reference signals I REF a, I REF b, and I REF c. These reference signals are then supplied to the current regulator 51 which controls the three pairs of the IGBTs of the utility converter 25.

By multiplying the desired value of the current (Imag) by the normalized sensed values of the voltage from the grid, the current is caused to flow to and from the utility grid always substantially in phase with the voltage of the grid to maintain a constant unity power factor in accordance with the disclosed embodiments of the invention. Such an arrangement is highly efficient and effective.

Considering now the dc voltage regulator 53 in greater detail, the dc voltage regulator 53 regulates the voltage of the dc bus 21 by adjusting the current flowing to or from the utility grid in a manner that is in phase with the utility voltages, and therefore operating substantially at a unity power factor substantially at all times. The magnitude of the desired current to or from the utility grid is Imag. The value of Imag is calculated by a closed loop proportional and integral controller 58. The desired value of the voltage of the dc bus 21 is defined as $V_{DC}$ and the sensed value is defined as $V_{BUS}$ with units of volts for each. A summation circuit 61 causes the signal $V_{DC}$ to be subtracted from the signal $V_{BUS}$ from the dc bus 21 representative of the voltage on the capacitor 23, to generate an error term. This error term is regulated by the proportional and integral (PI) controller control loop such that the error is regulated toward zero, and the actual value of the $V_{DC}$ is driven to the desired value $V_{BUS}$. The output of the dc voltage regulator 53 is the signal Imag which is the desired peak magnitude of current flowing through the utility converter 25.

The value of Imag is multiplied by the multiplication circuits 44, 46, and 48 by signals that represent the normalized line to neutral voltages for each of the three phases of the utility grid voltage. As a result, the desired current level is provided and is used for the current regulation for each phase. In this regard, the signals I REF a, I REF b, and I REF c, for the respective phases A, B, and C of the utility converter 25, are in phase with the utility voltage with substantially no phase shift.

Considering now the current regulator 51 in greater detail, the current regulator 51 receives the desired utility matrix currents I REF a, I REF b and I REF c. The current regulator 51 also receives sensed inputs from the output of the utility converter 25. The sensed currents are designated as Ia, Ib, and Ic, which may be measured by current transducers. For each phase, the sensed current value may be subtracted from the desired current value by a summation circuit such as the summation circuit 62 for the A phase. Error terms are then generated. For example, in phase A, Ia is subtracted from I REF a to generate an error signal. The error terms such as the error term generated by the circuit 62 are compared by three comparators, such as a comparator 63 of the A phase, to a triangular shaped signal such as a signal LINE-TRI-A for the A phase. Thus, control signals A+, A−, B+, B−, C+ and C− are generated for turning on or off the utility converter IGBTs such as IGBTs 35 and 39 for the A phase. If the error is above the triangle wave, the proper IGBT, such as the IGBT 39, is turned on to cause the utility matrix current to go down which in this case, is the A−signal for the IGBT 39 of the A phase. The reverse process is used when the error is below the triangle wave to control the proper IGBT, such as the IGBT 35 for the A phase. Either a positive or a negative IGBT is turned on, but not both at the same time for any one of the three phases. For example, if A+ is on, then A− is off and if A− is on, then A+ is off. In this regard, the current regulator 51 includes an inverter for each phase such as an inverter 64 is used to invert the A+ signal from the comparator such as the comparator 63 for the A phase to provide the control signal A−. There is also a short delay between the switchings to avoid a short circuit across the dc bus 21. In this implementation, a triangle wave of 2 kHz is used and the current regulation calculations are made by analog hardware (not shown). A delay between changing the state of devices may be set to a value such as 5 microseconds, for certain applications. The current regulation may be accomplished by a variety of techniques including, but not limited to, the use of digital logic (not shown). This may also include filtering of the actual and reference signals.

While particular embodiments of the present invention have been disclosed, it is to be understood that various different modifications are passing and one contemplated within the true spirit and scope of the appended claims. For example, while discrete circuits have been described for certain functions, it will become apparent to those skilled in the art that such functions may be implemented in whole or in part by software. There is no intention, therefore, of limitations to the exact abstract or disclosure herein presented.

What is claimed is:

1. A method of converting wind generated electricity to constant frequency electricity for supplying it to a utility grid, comprising:
    using a wind turbine generator having a doubly fed induction generator; generating electricity from the rotor of the generator for supplying it to the utility grid when operating at a rotational speed of the generator above synchronous speed;
    supplying electricity to the rotor of the generator when operating at a rotational speed below the synchronous speed of the generator and facilitating the generation of electricity from the stator;
    converting the electricity from the rotor to dc electricity and converting the dc electricity to ac electricity at a constant unity power factor of at least 0.99; and
    adjusting the current of the ac electricity to or from the utility grid to be in phase with the utility grid voltage, comprising the steps of:
    sensing a line to neutral voltage from the utility grid;
    generating a normalized voltage value by dividing the sensed line to neutral voltages by the peak voltage of the utility grid;
    multiplying the normalized voltage value by a desired current signal to produce a reference signal that is in phase with the utility voltage;
    sensing the current of the ac electricity to or from the utility grid;
    subtracting the sensed current from the reference signal to generate an error signal;
    and comparing the error signal to a triangular shaped signal to generate a control signal;
    wherein the ac electricity is at a constant unity power factor of at least 0.99.

2. A method according to claim 1, further including generating electricity from the stator of the generator.

3. A method according to claim 1, wherein the adjusting includes calculating a desired current magnitude and multiplying it by a normalized voltage value of the utility grid voltage to provide a desired current value for current regulation of the ac electricity in phase with the utility grid voltage without any substantial phase shift.

4. A method according to claim 3, wherein the calculating includes subtracting the value of the dc voltage to provide an error voltage value.

5. A method according to claim 4, wherein the calculating includes using a closed loop proportional and integral controller for regulating the error voltage value to produce the desired current magnitude.

6. A method according to claim 5, further including determining the normalized voltage value by sensing the line to neutral voltage of the utility grid, and dividing the value of the sensed voltage by the peak magnitude of the sensed voltage to provide the normalized voltage value.

7. A method according to claim 6, further including regulating the desired current magnitude in response to the current value of the ac current.

8. A system of converting wind generated electricity for supplying it to a utility grid, comprising:
    a wind turbine generator having a doubly fed induction generator;
    means for generating electricity from the rotor of the generator for supplying it to the utility grid when operating at a rotational speed of the generator above synchronous speed;
    means for supplying electricity to the rotor of the generator when operating at a rotational speed below the synchronous speed of the generator and for facilitating the generation of electricity from the stator;
    means for converting the electricity from the rotor to dc electricity and converting the dc electricity to ac electricity at a constant unity power factor of at least 0.99 above synchronous speed of the generator;
    means for adjusting the current of the ac electricity to or from the utility grid to be in phase with the utility grid voltage; and
    wherein the ac electricity is at constant unity power factor of at least 0.99.

9. A system according to claim 8, wherein said means for generating electricity includes means for generating electricity from the stator of the generator.

10. A system according to claim 8, wherein the means for adjusting includes means for calculating a desired current magnitude and multiplying it by a normalized voltage value of the utility grid voltage to provide a desired current value for current regulation of the so electricity in phase with the utility grid voltage without any substantial phase shift.

11. A system according to claim 10, wherein the means for calculating includes subtracting the value of the dc voltage from a desired value of the dc voltage to provide an error voltage value.

12. A system according to claim 11, wherein the means for calculating includes using a closed loop proportional and integral controller for regulating the error voltage value to produce the desired current magnitude.

13. A system according to claim 12, further including means for determining the normalized voltage value by sensing the line to neutral voltage of the utility grid, and means for dividing the value of the sensed voltage by the peak magnitude of the sensed voltage to provide the normalized voltage value.

14. A system according to claim 13, further including means for regulating the desired current magnitude in response to the current value of the ac current.

15. A system of converting wind generated electricity to constant frequency electricity for supplying it to a utility grid, comprising:
   a wind turbine generator having a doubly fed induction generator;
   said generator having a rotor for generating electricity from the rotor of the generator for supplying it to the utility grid when operating at a rotational speed of the generator above synchronous speed;
   a generator converter for converting the electricity from the rotor to dc electricity above synchronous speed of the generator;
   the generator converter supplying electricity to the rotor of the generator when operating at a rotational speed below the synchronous speed of the generator and for facilitating the generation of electricity from the stator;
   a utility converter for converting the dc electricity to ac electricity at at a constant unity power factor of at least 0.99;
   at least one circuit for adjusting the current of the ac electricity to or from the utility grid to be maintained in phase with the utility grid voltage; and
   wherein the ac electricity is at a constant unity power factor of at least 0.99.

16. A system according to claim 15, wherein the generator includes a stator for generating electricity from the stator of the generator.

17. A system according to claim 15, wherein the at least one circuit for adjusting includes calculating a desired current magnitude and multiplying it by a normalized voltage value of the utility grid voltage to provide a desired current value for current regulation of the so electricity in phase with the utility grid voltage without any substantial phase shift.

18. A system according to claim 17, wherein the calculating includes subtracting the value of the dc voltage from a desired value of the dc voltage to provide an error voltage value.

19. A system according to claim 18, wherein the calculating includes using a closed loop proportional and integral controller for regulating the error voltage value to produce the desired current magnitude.

20. A system according to claim 19, further including at least one circuit for determining the normalized voltage value by sensing the line to neutral voltage of the utility grid, and dividing the value of the sensed voltage by the peak magnitude of the sensed voltage to provide the normalized voltage value.

21. A system according to claim 20, further including a current regulator for regulating the desired current magnitude in response to the current value of the ac current.

22. A method of converting wind generated electricity to constant frequency electricity for supplying it to a utility grid by using a wind turbine generator having a doubly fed induction generator for generating electricity from the rotor of the generator when operating at a rotational speed of the generator above synchronous speed for supplying it to the utility grid, comprising:

supplying electricity to the rotor of the generator when operating at a rotational speed of the generator below synchronous speed and facilitating the generation of electricity from the stator;
converting the electricity from the rotor to dc electricity and converting the dc electricity to ac electricity at a constant unity power factor of at least 0.99;
adjusting the current of the ac electricity from the rotor to or from the utility grid to be in phase with the utility grid voltage; and
wherein the ac electricity is at a constant unity power factor of at least 0.99.

23. A method of converting wind generated electricity to constant frequency electricity for supplying it to a utility grid, comprising:
   using a wind turbine generator having a doubly fed induction generator;
   generating electricity from the rotor of the generator for supplying it to the utility grid when operating at a rotational speed of the generator above synchronous speed;
   converting the electricity from the rotor to dc electricity and converting the dc electricity to ac electricity at a constant unity power factor of at least 0.99;
   adjusting the current of the ac electricity to or from the utility grid to be in phase with the utility grid voltage; and
   wherein the ac electricity is at a constant unity power factor of at least 0.99.

24. A method according to claim 23, further including generating electricity from the stator of the generator.

25. A method according to claim 23, wherein the adjusting includes calculating a desired current magnitude end multiplying it by a normalized voltage value of the utility grid voltage to provide a desired current value for current regulation of the ac electricity in phase with the utility grid voltage without any substantial phase shift.

26. A method according to claim 25, wherein the calculating includes subtracting the value of the dc voltage to provide an error voltage value.

27. A method according to claim 26, wherein the calculating includes using a closed loop proportional and integral controller for regulating the error voltage value to produce The desired current magnitude.

28. A method according to claim 27, further including determining the normalized voltage value by sensing the line to neutral voltage of the utility grid, and dividing the value of the sensed voltage by the peak magnitude of the sensed voltage to provide the normalized voltage value.

29. A method according to claim 28, further including regulating the desired current magnitude in response to the current value of the ac current.

30. A method of converting wind generated electricity to constant frequency electricity for supplying it to a utility grid, comprising:
   using a wind turbine generator having a doubly fed induction generator;
   supplying electricity to the rotor of the generator when operating at a rotational speed below the synchronous speed of the generator and facilitating the generation of electricity from the stator;
   converting the electricity from the grid to dc electricity and converting the dc electricity to ac electricity;
   adjusting the current of the electricity flowing to or from the utility grid to be in phase with the utility grid voltage; and wherein the ac electricity supplied to the rotor is at a constant unity power factor of at least 0.99.

31. A method according to claim 30, further including generating electricity from the stator of the generator.

32. A method according to claim 30, wherein the adjusting includes calculating a desired current magnitude and multiplying it by a normalized voltage value of the utility grid voltage to provide a desired current value for current regulation of the ac electricity in phase with the utility grid voltage without any substantial phase shift.

33. A method according to claim 32, wherein the calculating includes subtracting the value of the dc voltage to provide an error voltage value.

34. A method according to claim 33, wherein the calculating includes using a closed loop proportional and integral controller for regulating the error voltage value to produce the desired current magnitude.

35. A method according to claim 34, further including determining the normalized voltage value by sensing the line to neutral voltage of the utility grid, and dividing the value of the sensed voltage by the peak magnitude of the sensed voltage to provide the normalized voltage value.

36. A method according to claim 35, further including regulating the desired current magnitude In response to the current value of the ac current.

37. A system of converting wind generated electricity for supplying it to a utility grid, comprising:
- a wind turbine generator having a doubly fed induction generator;
- means for generating electricity from the rotor of the generator for supplying it to the utility grid when operating at a rotational speed of the generator above synchronous speed;
- means for converting the electricity from the rotor to dc electricity and converting the dc electricity to ac electricity at a non-adjustable substantially unitary power factor to supply to the utility grid above synchronous speed of the generator;
- means for adjusting the current of the electricity flowing to or from the utility grid to be in phase with the utility grid voltage;
- and wherein the ac electricity is at a constant unity power factor of at least 0.99.

38. A system according to claim 37, wherein said means for generating electricity includes means for generating electricity from the stator of the generator.

39. A system according to claim 37, wherein the means for adjusting includes means for calculating a desired current magnitude and multiplying it by a normalized voltage value of the utility grid voltage to provide a desired current value for current regulation of the at electricity in phase with the utility grid voltage without any substantial phase shift.

40. A system according to claim 39, wherein the means for calculating includes subtracting the value of the dc voltage from a desired value of the dc voltage to provide an error voltage value.

41. A system according to claim 40, wherein the means for calculating includes using a closed loop proportional and integral controller for regulating the error voltage value to produce the desired current magnitude.

42. A system according to claim 41, further including means for determining the normalized voltage value by sensing the line to neutral voltage of the utility grid, and means for dividing the value of the sensed voltage by the peak magnitude of the sensed voltage to provide the normalized voltage value.

43. A system according to claim 42, further including means for regulating the desired current magnitude in response to the current value of the ac current.

44. A system of converting wind generated electricity for supplying it to a utility grid, comprising:
- a wind turbine generator having a doubly fed induction generator;
- means for supplying electricity to the rotor of the generator when operating at a rotational speed below the synchronous speed of the generator and for facilitating the generation of electricity from the stator;
- means for converting the electricity from the grid to dc electricity and converting the dc electricity to ac electricity and for supplying the ac electricity to the rotor;
- means for adjusting the current of the electricity flowing to or from the utility grid to be in phase with the utility grid voltage;
- and wherein the ac electricity supplied to the rotor is at a constant unity power factor of at least 0.99.

45. A system according to claim 44, wherein said means for generating electricity includes means for generating electricity from the stator of the generator.

46. A system according to claim 44, wherein the means for adjusting includes means for calculating a desired current magnitude and multiplying it by a normalized voltage value of the utility grid voltage to provide a desired current value for current regulation of the ac electricity in phase with the utility grid voltage without any substantial phase shift.

47. A system according to claim 46, wherein the means for calculating includes subtracting the value of the dc voltage from a desired value of the dc voltage to provide an error voltage value.

48. A system according to claim 47, wherein the means for calculating includes using a closed loop proportional and integral controller for regulating the error voltage value to produce the desired current magnitude.

49. A system according to claim 48, further including means for determining the normalized voltage value by sensing the line to neutral voltage of the utility grid, and means for dividing the value of the sensed voltage by the peak magnitude of the sensed voltage to provide the normalized voltage value.

50. A system according to claim 49, further including means for regulating the desired current magnitude in response to the current value of the ac current.

51. A system of converting wind generated electricity to constant frequency electricity for supplying it to a utility grid, comprising:
- a wind turbine generator having a doubly fed induction generator;
- said generator having a rotor for generating electricity from the rotor of the generator for supplying it to the utility grid when operating at a rotational speed of the generator above synchronous speed;
- a generator converter for converting the electricity from the rotor to dc electricity above synchronous speed of the generator;
- a utility converter for converting the dc electricity to ac electricity at a constant unity power factor of at least 0.99;
- at least one circuit for adjusting the current of the ac electricity flowing to or from the utility grid to be in phase with the utility grid voltage;
- and
- wherein the ac electricity is at a constant unity power factor of at least 0.99.

52. A system according to claim 51, wherein the generator includes a stator for generating electricity from the stator of the generator.

53. A system according to claim 51, wherein the at least one circuit for adjusting includes calculating a desired current magnitude and multiplying it by a normalized voltage value of the utility grid voltage to provide a desired current value for current regulation of the so electricity in phase with the utility grid voltage without any substantial phase shift.

54. A system according to claim 53, wherein the calculating includes subtracting the value of the dc voltage from a desired value of the dc voltage to provide an error voltage value.

55. A system according to claim 54, wherein the calculating includes using a closed loop proportional and integral controller for regulating the error voltage value to produce the desired current magnitude.

56. A system according to claim 55, further including at least one circuit for determining the normalized voltage value by sensing the line to neutral voltage of the utility grid, and dividing the value of the sensed voltage by the peak magnitude of the sensed voltage to provide the normalized voltage value.

57. A system according to claim 56, further including a current regulator for regulating the desired current magnitude in response to the current value of the ac current.

58. A system of converting wind generated electricity to constant frequency electricity for supplying it to a utility grid, comprising:
  a wind turbine generator having a doubly fed induction generator;
  said generator having a rotor; a generator converter for supplying electricity to the rotor of the generator when operating at a rotational speed below the synchronous speed of the generator and for facilitating the generation of electricity from the stator;
  a utility converter for converting the ac electricity from the grid to dc electricity;
  at least one circuit for adjusting the current of the electricity flowing to or from the utility grid to be in phase with the utility grid voltage;
  the generator converter converting the dc electricity to ac electricity; and
  wherein the ac electricity is supplied to the rotor at a constant unity power factor of at least 0.99.

59. A system according to claim 58, wherein the generator Includes a stator for generating electricity from the stator of the generator.

60. A system according to claim 58, wherein the at least one circuit for adjusting includes calculating a desired current magnitude and multiplying it by a normalized voltage value of the utility grid voltage to provide a desired current value for current regulation of the ac electricity in phase with the utility grid voltage without any substantial phase shift.

61. A system according to claim 60, wherein the calculating includes subtracting the value of the dc voltage from a desired value of the dc voltage to provide an error voltage value.

62. A system according to claim 61, wherein the calculating includes using a closed loop proportional and integral controller for regulating the error voltage value to produce the desired current magnitude.

63. A system according to claim 62, further including at least one circuit for determining the normalized voltage value by sensing the line to neutral voltage if the utility grid, and dividing the value of the sensed voltage by the peak magnitude of the sensed voltage to provide the normalized voltage value.

64. A system according to claim 63, further including a current regulator for regulating the desired current magnitude in response to the current value of the ac current.

* * * * *

UNITED STATES PATENT AND TRADEMARK OFFICE
CERTIFICATE OF CORRECTION

PATENT NO. : 7,215,035 B2 Page 1 of 1
APPLICATION NO. : 11/063409
DATED : May 8, 2007
INVENTOR(S) : Raymond M. Hudson It is certified that error appears in the above-identified patent and that said Letters Patent is hereby corrected as shown below:

Title Page, Item (57) ABSTRACT, line 3, delete "grid." and insert -- grid --

Claim 10, column 6, line 56, delete "so" and insert -- ac --

Claim 17, column 7, line 40, delete "so" and insert -- ac --

Claim 25, column 8, line 33, delete "end" and insert -- and --

Claim 27, column 8, line 45, delete "The" and insert -- the --

Claim 37, column 9, line 39, delete "the electricity flowing" and insert -- the ac electricity from the rotor --

Claim 37, column 9, line 40, after "be" insert -- maintained --

Claim 39, column 9, line 51, delete "at" and insert -- ac --

Claim 53, column 11, line 8, delete "so" and insert -- ac --

Claim 59, column 12, line 10, delete "Include" and insert -- includes --

Claim 63, column 12, line 30, delete "if" and insert -- of --

Signed and Sealed this

Eighteenth Day of December, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,215,035 B2 | Page 1 of 1 |
| APPLICATION NO. | : 11/063409 | |
| DATED | : May 8, 2007 | |
| INVENTOR(S) | : Raymond M. Hudson | |

It is certified that error appears in the above-identified patent and that said Letters Patent is hereby corrected as shown below:

Title Page, Item (57) ABSTRACT, line 6, delete "de" and insert -- dc --

Signed and Sealed this

Thirteenth Day of May, 2008

JON W. DUDAS
*Director of the United States Patent and Trademark Office*